(12) United States Patent
Rodriguez-Cano et al.

(10) Patent No.: US 10,886,977 B2
(45) Date of Patent: Jan. 5, 2021

(54) INTEGRATED END-FIRE MM-WAVE ANTENNA ARRAY WITH LOW FREQUENCY METAL-FRAMED ANTENNA

(71) Applicant: wiSpry, Inc., Irvine, CA (US)

(72) Inventors: Rocío Rodriguez-Cano, Aalborg (DK); Shuai Zhang, Aalborg (DK); Gert Frølund Pedersen, Storvorde (DK)

(73) Assignee: AALBORG UNIVERSITY, Aalborg (DK)

( * ) Notice: Subject to any disclaimer, the term of this patent is extended or adjusted under 35 U.S.C. 154(b) by 0 days.

(21) Appl. No.: 16/557,543

(22) Filed: Aug. 30, 2019

(65) Prior Publication Data

US 2020/0076479 A1    Mar. 5, 2020

Related U.S. Application Data

(60) Provisional application No. 62/725,740, filed on Aug. 31, 2018.

(51) Int. Cl.
| | | |
|---|---|---|
| *H04B 7/0426* | (2017.01) |
| *H01Q 21/29* | (2006.01) |
| *H04B 7/06* | (2006.01) |
| *H01Q 1/24* | (2006.01) |
| *H01Q 1/36* | (2006.01) |
| *H01Q 5/392* | (2015.01) |
| *H01Q 7/00* | (2006.01) |

(52) U.S. Cl.
CPC ............ *H04B 7/043* (2013.01); *H01Q 1/246* (2013.01); *H01Q 1/36* (2013.01); *H01Q 5/392* (2015.01); *H01Q 7/00* (2013.01); *H01Q 21/293* (2013.01); *H04B 7/0617* (2013.01)

(58) Field of Classification Search
CPC ............ H01Q 7/00; H01Q 1/246; H01Q 1/36; H01Q 21/293; H04B 7/0617; H04B 7/043
See application file for complete search history.

(56) References Cited

U.S. PATENT DOCUMENTS

| | | | | |
|---|---|---|---|---|
| 5,557,293 A | * | 9/1996 | McCoy ................. | H01Q 1/242 343/702 |
| 6,288,682 B1 | * | 9/2001 | Thiel ..................... | H01Q 1/242 343/702 |

(Continued)

FOREIGN PATENT DOCUMENTS

| | | |
|---|---|---|
| KR | 10-1750198 B1 | 6/2017 |
| KR | 10-2017-0083949 A | 7/2017 |

(Continued)

OTHER PUBLICATIONS

International Search Report and Written Opinion for Application No. PCT/US2019/049168 dated Dec. 18, 2019.

*Primary Examiner* — Khanh C Tran
(74) *Attorney, Agent, or Firm* — Jenkins, Wilson, Taylor & Hunt, P.A.

(57) ABSTRACT

The present subject matter relates to antenna systems, devices, and methods that are designed to avoid the degradation of the end-fire radiation pattern of the array when a piece of metal is added obstructing the direction of the main beam. A parasitic radiator is positioned in proximity to the blocking structure and configured to couple at least part of the reflected radiation pattern and radiate toward the desired end-fire direction.

18 Claims, 15 Drawing Sheets

(56) References Cited

U.S. PATENT DOCUMENTS

| | | | |
|---|---|---|---|
| 2008/0129640 A1* | 6/2008 | Shtrom | H01Q 3/24 343/876 |
| 2013/0069837 A1 | 3/2013 | Cozzolino et al. | |
| 2014/0118196 A1* | 5/2014 | Koskiniemi | H01Q 1/42 343/702 |
| 2014/0138546 A1* | 5/2014 | Iluz | B82Y 20/00 250/349 |
| 2014/0266932 A1* | 9/2014 | Schmidt | H01Q 1/286 343/712 |
| 2016/0056530 A1 | 2/2016 | Lee et al. | |
| 2018/0034134 A1 | 2/2018 | Dalmia | |
| 2018/0123229 A1* | 5/2018 | Stratis | H01Q 1/42 |

FOREIGN PATENT DOCUMENTS

| | | |
|---|---|---|
| KR | 3 378 125 B1 | 12/2019 |
| WO | WO 2020/047480 A1 | 3/2020 |

* cited by examiner

INTEGRATED END-FIRE MM-WAVE ANTENNA ARRAY WITH LOW FREQUENCY METAL-FRAMED ANTENNA

CROSS-REFERENCE TO RELATED APPLICATION

This patent application claims priority to U.S. Provisional Patent Application Ser. No. 62/725,740, filed Aug. 31, 2018, the disclosure of which is incorporated herein by reference in its entirety.

TECHNICAL FIELD

The subject matter disclosed herein relates generally to mobile antenna systems and devices.

BACKGROUND

End-fire radiation pattern-antennas face a blockage problem when a metal or other signal-deflecting material is placed on top of the substrate obstructing the direction of the main beam or main lobe of the generated radiation pattern. In particular, placing a metallic sheet perpendicular to the substrate can degrade the radiation pattern of even the most robust antenna.

SUMMARY

In accordance with this disclosure, systems, devices, and methods for controlling a radiation pattern of one or more antenna elements are provided. In one aspect, an antenna system is provided in which at least one antenna element is configured to generate a directional radiation pattern including a main beam pointed in a first direction. A blocking structure at least partially obstructs a portion of the main beam in the first direction, wherein the blocking structure generates a reflected radiation pattern. A parasitic radiator positioned in proximity to the blocking structure is configured to couple at least part of the reflected radiation pattern and radiate toward the first direction.

In another aspect, a method for operating an antenna array includes generating a directional radiation pattern including a main beam pointed in a first direction from at least one antenna element, generating a reflected radiation pattern by at least partially obstructing a portion of the main beam in the first direction with a blocking structure, and coupling at least part of the reflected radiation pattern and radiating toward the first direction.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1:
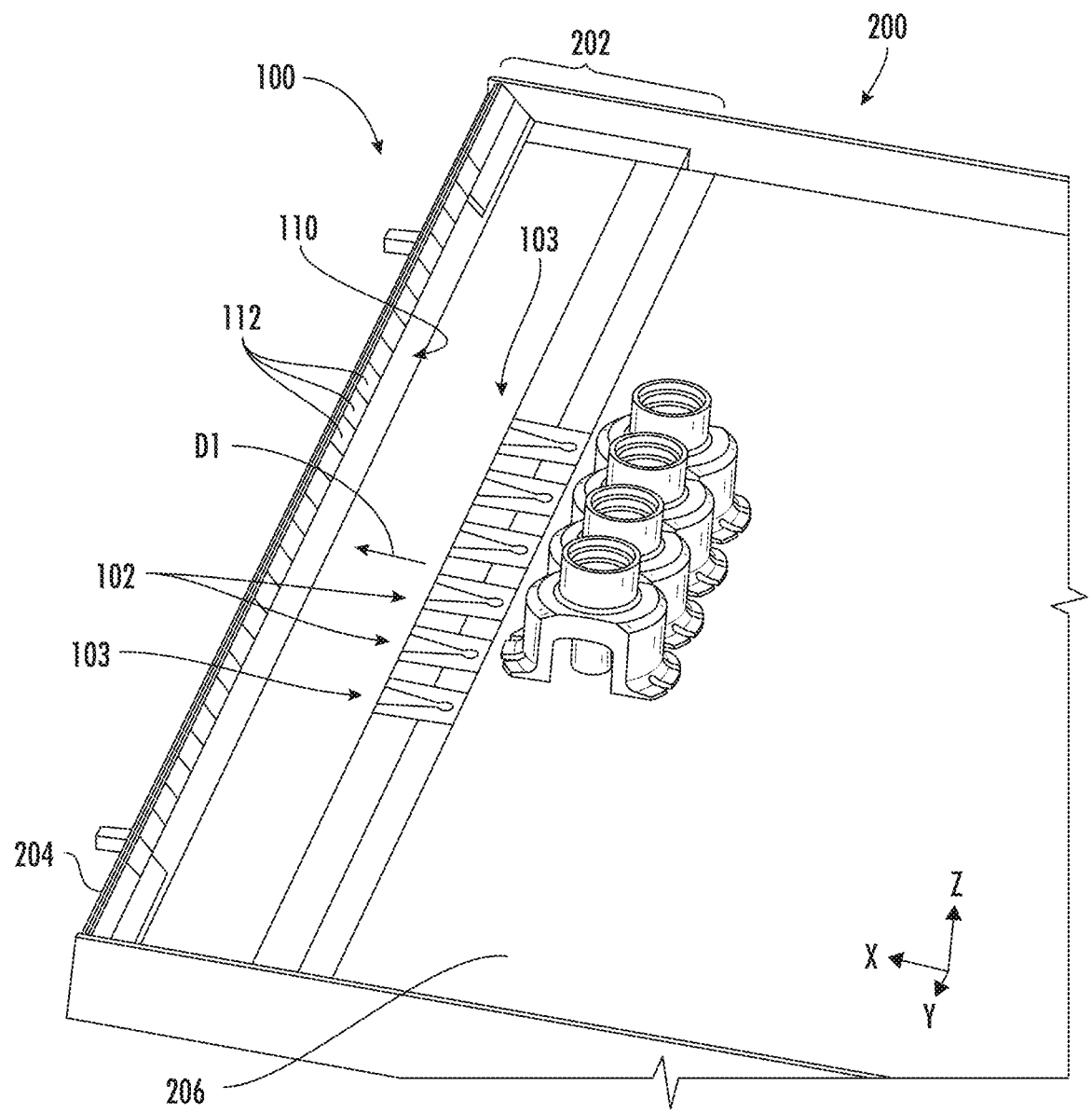
FIG. 1 is a side perspective view of a high-frequency antenna of a mobile device according to an embodiment of the presently disclosed subject matter.

The present subject matter provides a new antenna array for the fifth generation of mobile communications, which in some embodiments can be collocated with a dual-band metal-framed antenna configured for communication in the former low-frequency spectrum. The present systems, devices, and methods are designed to avoid the degradation of the end-fire radiation pattern of the array when a piece of metal or other signal-deflecting material obstructs the direction of the main beam. For example, in one embodiment illustrated in FIGS. 1 and 2, the present subject matter provides an arrangement of a high-frequency antenna array, generally designated 100, including one or more antenna element 102 positioned near an end of a mobile device 200. In some embodiments, for example, antenna array 100 is positioned within a clearance space 202 of mobile device 200, which is about 7 mm wide. Antenna array 100 is configured to generate a directional radiation pattern in at least a first direction D1, such as the direction of a main beam or main lobe of the radiation pattern produced by the one or more antenna element 102. In configurations in which mobile device 200 has a generally rectangular shape, first direction D1 can be oriented outwardly from a short edge of mobile device 200 or outwardly from a long edge of mobile device 200 depending on the configuration of antenna element 102.

In some configurations, however, mobile device 200 further includes one or more blocking structure, generally designated 204, which is positioned near antenna array 100 in or around first direction D1 such that blocking structure 204 at least partially obstructs a portion of the directional radiation pattern in first direction D1. In some embodiments, for example, such a blocking structure 204 is composed of a metal or other material that degrades the radiation pattern in first direction D1. In some embodiments, for example, blocking structure 204 can be part of a further radiating structure configured for communication at a frequency different than the at least one antenna element 102. For example, in some embodiments, blocking structure 204 is part of a dual-loop metal-framed antenna system for mobile device 200 as will be discussed further below. Those having ordinary skill in the art will recognize, however, that problems with degradation of the end-fire radiation pattern of antenna array 100 discussed herein are not limited to configurations that include metal frame elements of the dual-loop antenna system. Similarly, any of a variety of other components can exhibit similar impact on the radiation pattern when in a position blocking the main beam.

Figure 4:
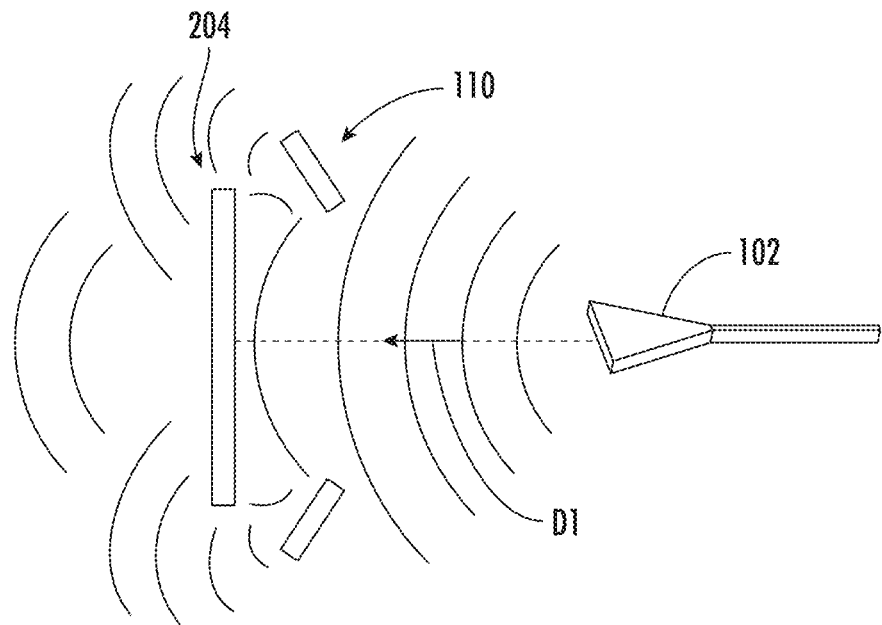
FIG. 4 is a schematic view of an arrangement of metal strips for modifying a wavefront from an antenna according to an embodiment of the presently disclosed subject matter.

Regardless of the particular configuration or function of blocking structure 204, when a metal or similar material is placed obstructing the direction of the main beam, at least a portion of the wavefront is reflected, effectively changing the end-fire radiation pattern into a more broadside pattern. To counteract this alteration to the wavefront, mobile device 200 includes a parasitic radiator 110 positioned in proximity to blocking structure 204 and configured to couple at least part of the reflected radiation pattern and radiate in a direction that is substantially aligned with first direction D1. This arrangement is designed to couple the radiation reflected from blocking structure 204 and point to the desired end-fire direction. As illustrated in FIG. 4, the coupling between parasitic radiator 110 and one or both the edges of blocking structure 204 can be used to effectively form one beam again. In this way, parasitic radiator 110 works as a kind of "repeater." In this arrangement, the combination of parasitic radiator 110 with blocking structure 204 provides broad end-fire bandwidth. In addition, in some embodiments, antenna elements 102 are each substantially aligned with a center of the width of blocking structure 204 to help optimize end-fire gain. Those having ordinary skill in the art will recognize, however, that any of a variety of other radiator configurations can be used to couple the energy.

Figure 3:
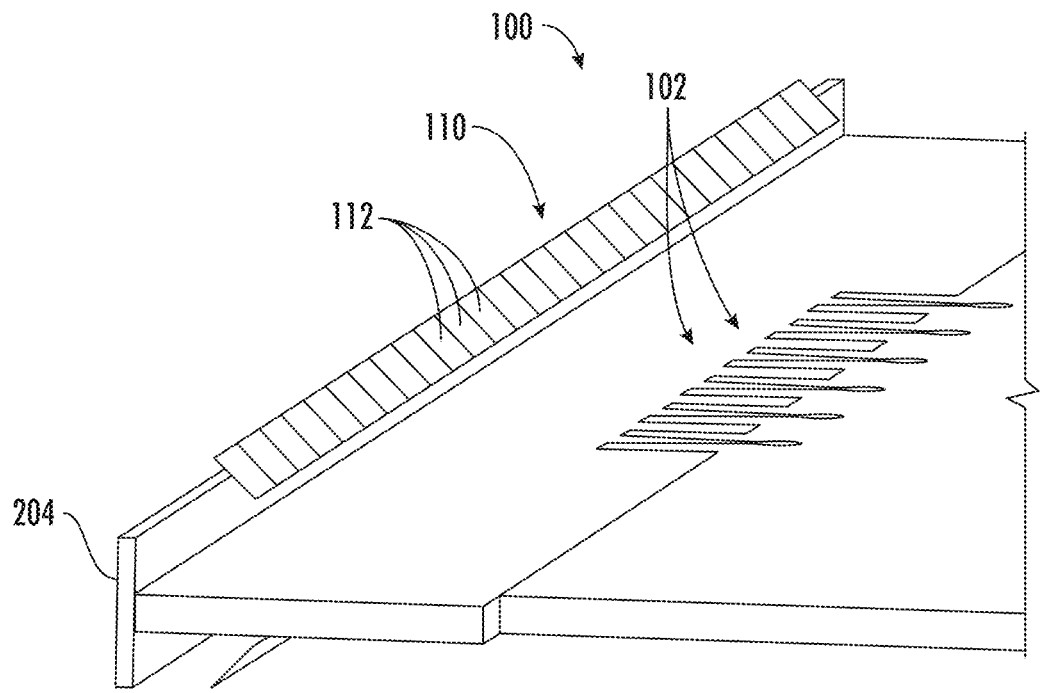
FIG. 3 is a side perspective view of an arrangement of metal strips for modifying a wavefront from an antenna according to an embodiment of the presently disclosed subject matter.

In some embodiments, parasitic radiator 110 includes an array of metal strips 112 that is placed in a region between antenna array 100 and blocking structure 204, such as proximal to one or both edges of blocking structure 204 as shown in FIG. 3. To optimize the coupling between parasitic radiator 110 and blocking structure 204, the angle, position, and arrangement of metal strips 112 can be selected to achieve a desired end-fire radiation pattern for a given antenna array 100 and surrounding blocking structure 204. In some embodiments, the array of metal strips 112 is positioned at a distance from blocking structure 204 that is substantially smaller than one quarter of a wavelength of the signal produced by the antenna array. In particular, the distance from blocking structure 204 can be designed to be small in order to ensure the coupling between blocking structure 204 and the array of metal strips 112.

Figure 5:
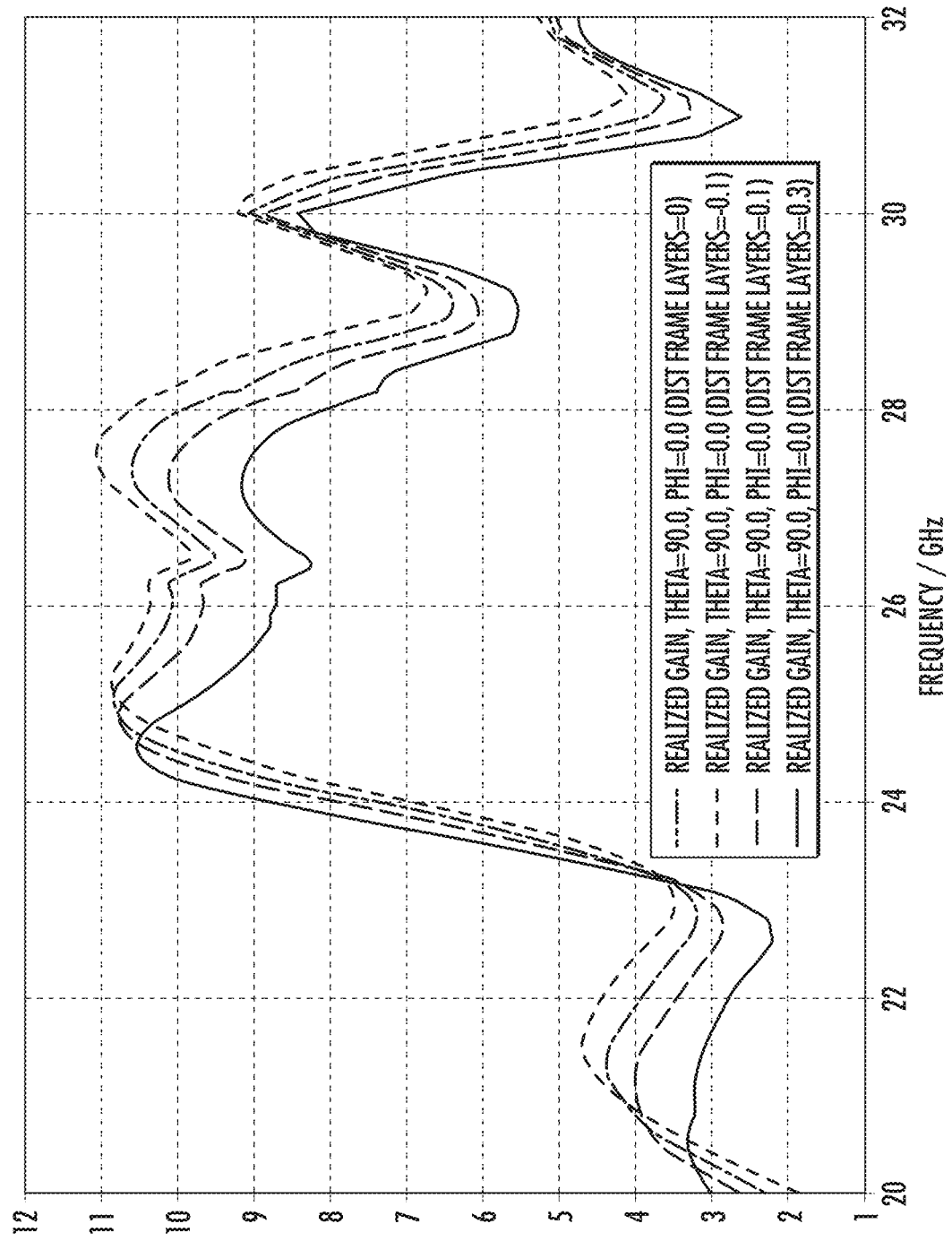
FIG. 5 is a graph of realized gain in an end-fire direction over a range of operating frequencies for different positioning of metal strips according to an embodiment of the presently disclosed subject matter.

In one exemplary embodiment, the tops of metals strips 112 are positioned at a distance of about 0.09 mm from the edge of blocking structure 204 to achieve performance in the operating frequency band that is similar to performance in configurations without blocking structure 204. This distance is equivalent to approximately $0.0078*\lambda$ at a center frequency of 26 GHz. Those having ordinary skill in the art will recognize that other spacings can be selected depending on the desired operating band for antenna system 100. Positioning metal strips 112 closer to blocking structure 204 can enhance the performance at higher frequencies, whereas if the distance between metal strips 112 and blocking structure 204 is increased, the performance at high frequencies will decrease and the main beam will not be aligned with first direction D1. In some embodiments, this misalignment can result in the main beam instead being oriented at an angle of up to about e=120 degrees with respect to the plane of blocking structure 204. Accordingly, the position of metal strips 112 can be selected to maintain a directional radiation pattern pointed in first direction D1. FIG. 5 illustrates the realized end-fire gain of antenna system 100 with metal strips 112 at a variety of spacings from blocking structure 204. In this model, the baseline value distFrameLayers=0 corresponds to $0.0078*\lambda$ at the center frequency of the band.

Figure 6:
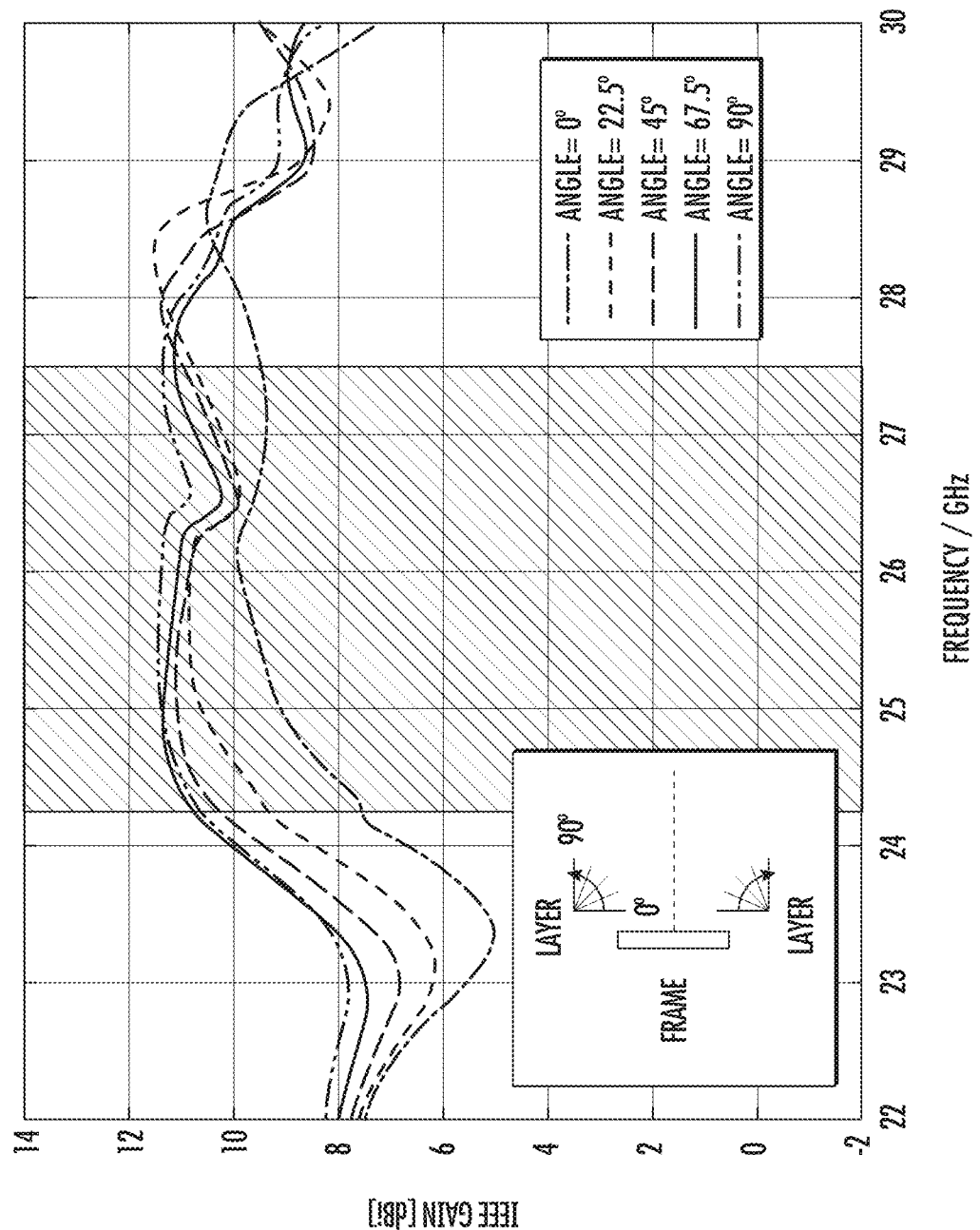
FIG. 6 is a graph of end-fire gain of an antenna array for different angular arrangements of metal strips according to an embodiment of the presently disclosed subject matter.

In combination with the spacing of these elements, metal strips 112 can further be arranged with respect to blocking structure 204 at an angle that is selected to produce a desired waveform for the beam generated by coupling the radiation reflected from blocking structure 204. As illustrated in FIGS. 3 and 4, for example, in some embodiments, metal strips 112 are arranged at an angle such that metal strips 112 each face a portion of blocking structure 204 between a center of blocking structure 204 and an outer edge of blocking structure 204. Those having ordinary skill in the art will recognize, however, that metal strips 112 can be arranged at any of a variety of angles with respect to blocking structure 204 to provide coupling. As shown in FIG. 6, the gain in the end-fire direction is similar at a range of angles larger than 22.5 degrees with respect to the plane of blocking structure 204. In this arrangement, metal strips 112 are oriented to direct the coupled radiation in a direction that is substantially aligned with first direction D1.

Figure 7:
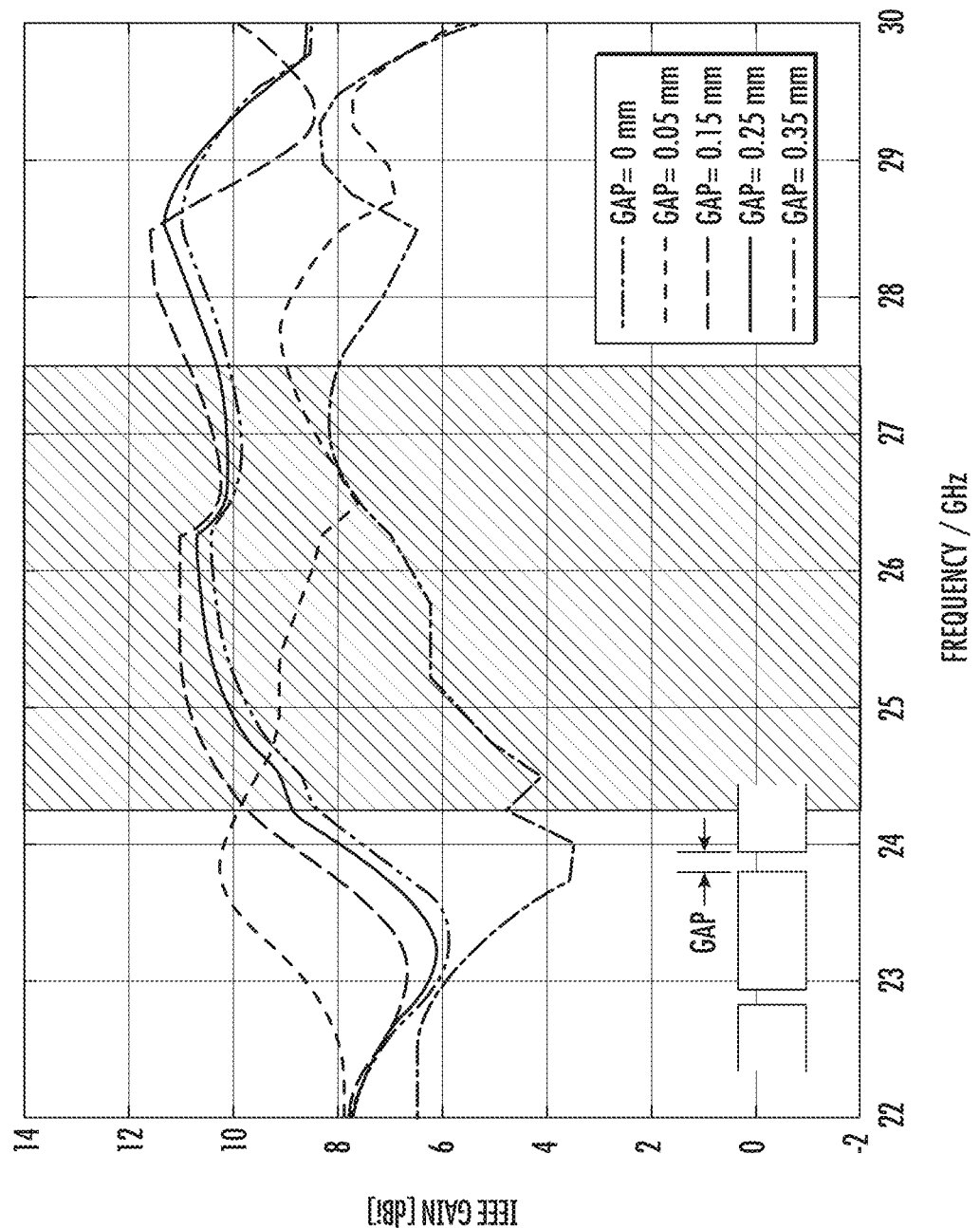
FIG. 7 is a graph of end-fire gain of an antenna array for different inter-strip gap spacings of metal strips according to an embodiment of the presently disclosed subject matter.

In addition, a gap between adjacent metal strips 112 can be adjusted to further optimize the end-fire gain. The performance of antenna system 100 for a variety of different gap spacings is shown in FIG. 7. In the experimental cases shown in this graph, having a small gap between metal strips 112 improves the gain, but the gain is optimized in configurations where the gap is small, such as between about 0.15 mm and 0.35 mm for the operating frequencies tested. For the configuration tested, a gap of 0.15 mm provided the best results within the selected operating band.

Figure 8:
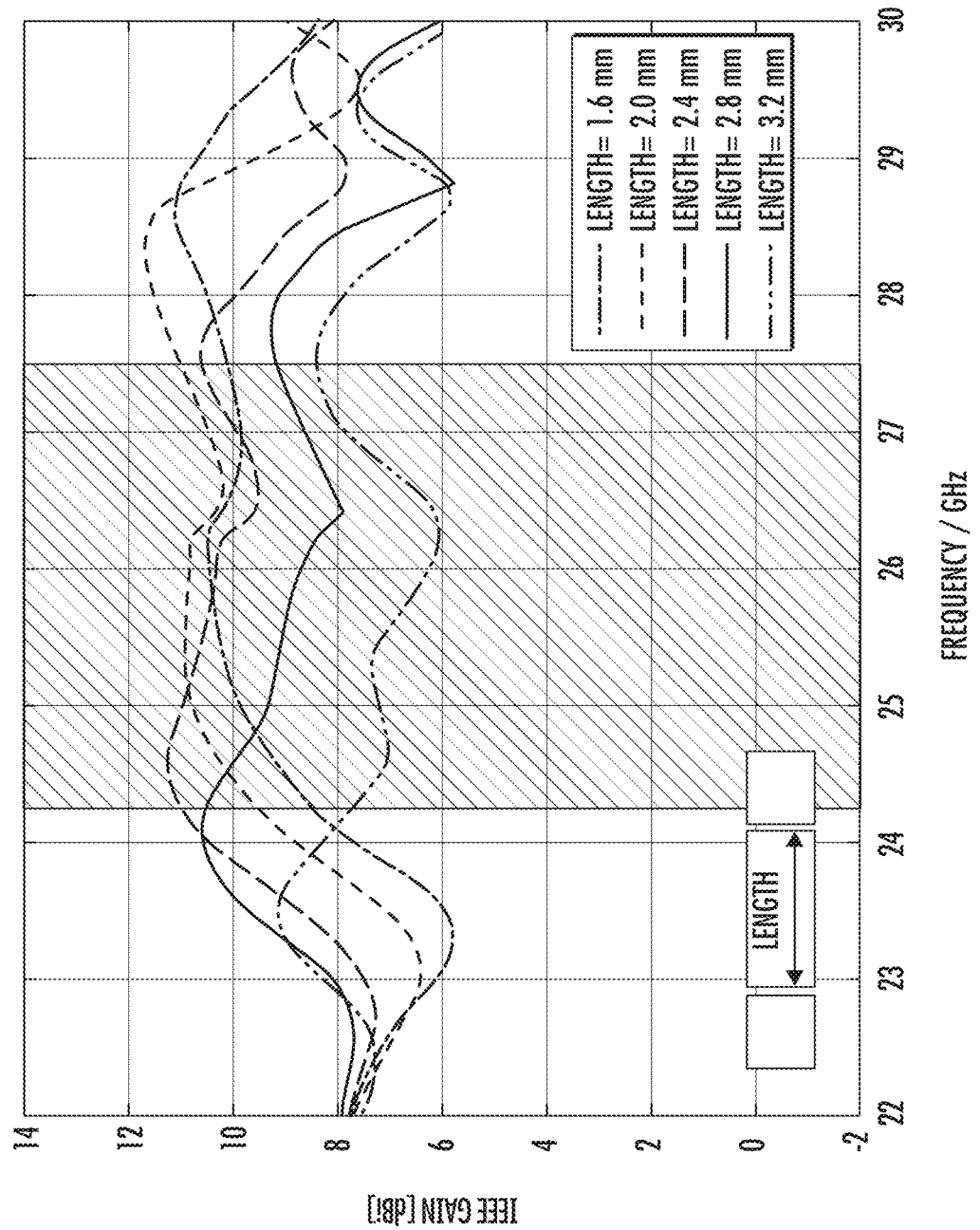
FIG. 8 is a graph of end-fire gain of an antenna array for different lengths of metal strips according to an embodiment of the presently disclosed subject matter.

In addition, the dimension of each of metal strips 112 extending perpendicular to first direction D1, referred to herein as the length of each strip, can be adjusted to further optimize the end-fire gain. The performance of antenna system 100 for a variety of different strip lengths is shown in FIG. 8. Although exemplary values for these parameters of strip position, gap spacing, and strip length are shown in these graphs, those having ordinary skill in the art will recognize that different values can be selected to optimize the end-fire gain based on the desired operating band, center frequency, or other parameters of the system operation.

In addition, the size and/or number of metal strips 112 can be selected to account for the steerability of the beam generated by antenna array 100. If antenna array 100 is only required to radiate in a fixed direction, the principle of operation discussed herein are operable with the number of metal strips 112 being equal to the number of antenna elements 102 in antenna array 100. In such a one-to-one relationship, each of metal strips 112 is positioned and arranged to particularly couple with the radiation associated with one of the at least one antenna element 102.

Figure 10A:
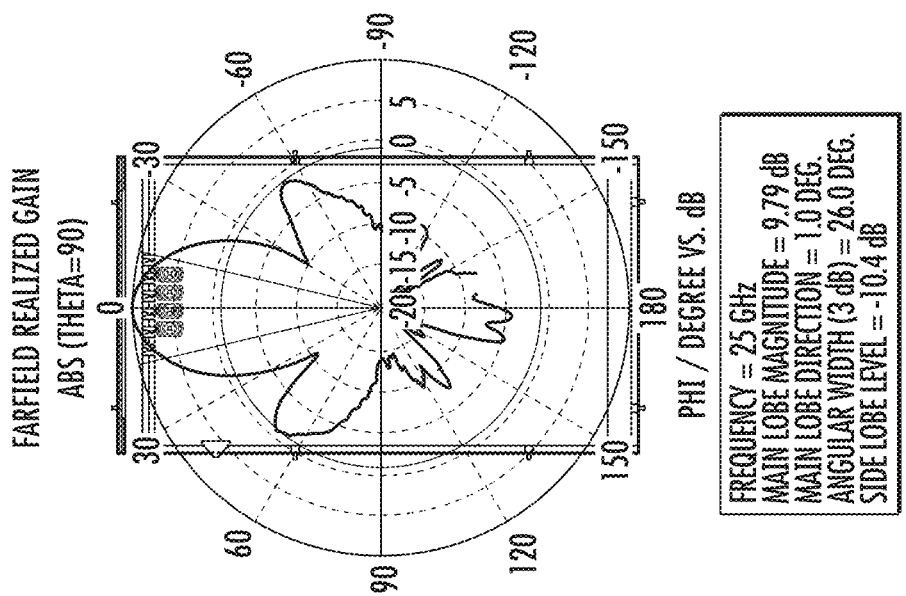
FIGS. 10A through 10C are graphs illustrating antenna performance of an antenna at various scanning angles according to an embodiment of the presently disclosed subject matter.
Figure 9:
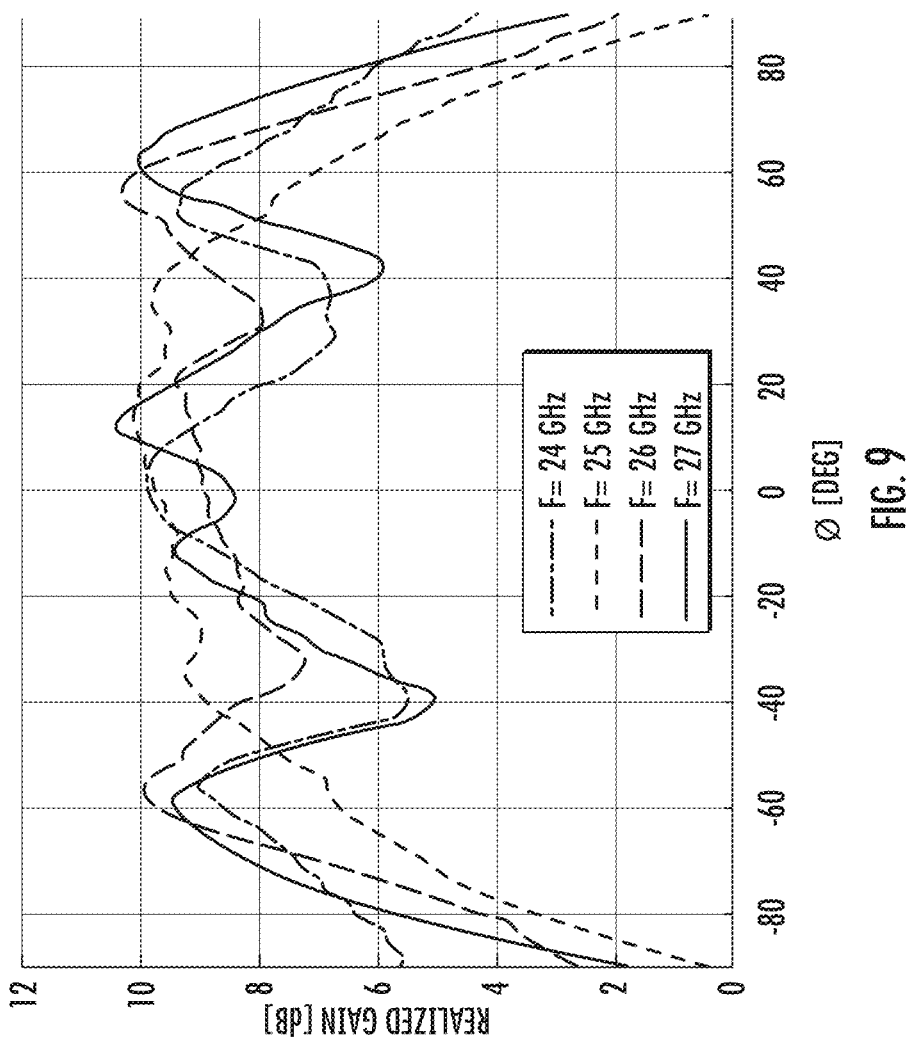
FIG. 9 is a graph of the scanning envelope of an antenna according to an embodiment of the presently disclosed subject matter.
Figure 10C:
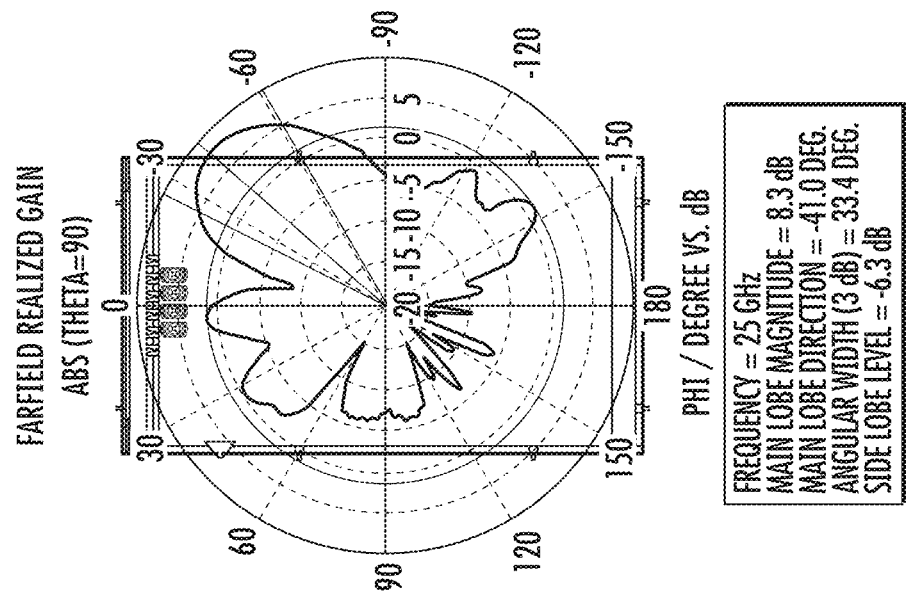
Figure 10B:
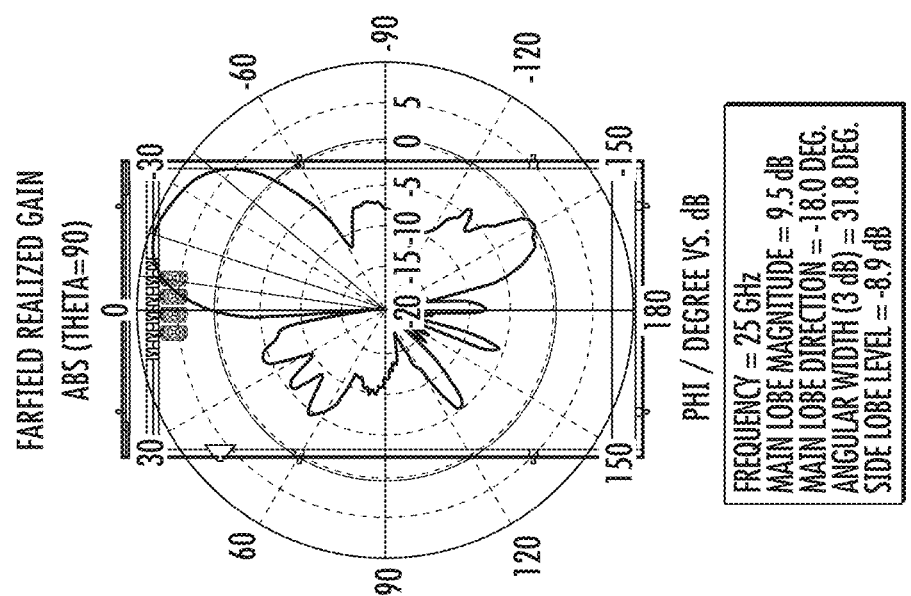
Figure 11:
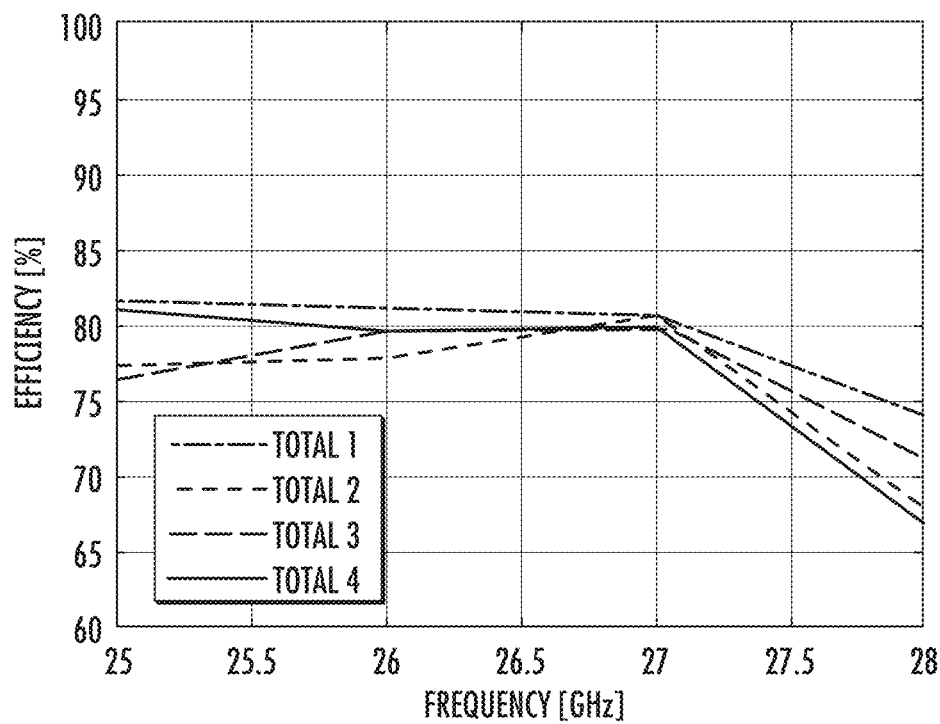
FIG. 11 is a graph of total efficiency over a range of frequencies of an antenna according to an embodiment of the presently disclosed subject matter.

Alternatively, in some embodiments in which antenna array 100 is configured to be steerable, parasitic radiator 110 includes an array of metal strips 112 that can couple the radiation reflected from blocking structure 204 at any of a range of beam directions. Specifically, in some embodiments, for example, a phase of the directional radiation pattern generated by each antenna element 102 of antenna array 100 is independently adjustable such that the direction of the main beam is steerable. In such an arrangement, parasitic radiator 110 is positioned to cover the entire sweep of this steering, with metal strips 112 being positioned to couple reflected beams that are directed at any of a range of angles with respect to antenna array 100. The scanning envelope at four frequencies is plotted in FIG. 9. Antenna array 100 can scan approximately from ϕ=±60°. Three different scanning angles are plotted in FIGS. 10A-C. The radiation efficiency is around 80% in most of the band, as drawn in FIG. 11, which illustrates the total efficiency of each antenna element 102 over a range of operating frequencies.

Regarding some particular configurations of antenna array 100 in which the present concepts can be applied, in some embodiments, the one or more antenna element 102 of antenna array 100 in the present systems, devices, and methods can each be an exponentially-tapered slot antenna, also known as Vivaldi. In the illustrated embodiments, antenna array 100 is composed of four antenna elements 102, with two more dummy grounded antennas 103 positioned on either side of the array to ensure the same boundary conditions for the active elements of antenna array 100. Each Vivaldi element has overall dimensions of 3.31× 3.61×0.64 mm$^3$, and it is implemented on Rogers R03006 substrate with dielectric permittivity of $\varepsilon_r$=6.15. The proposed antenna array 100 can be configured to generate an end-fire radiation pattern with a bandwidth from 23-29 GHz:

|  | −10 dB criterion impedance BW | −6 dB criterion impedance BW | End-fire radiation BW |
| --- | --- | --- | --- |
| Only Vivaldi | 23.5-27.5 | 23-29 | 23-29 |
| Vivaldi + Frame | 23.5-27 | 23-29.5 | 23-29 |

Figure 12:
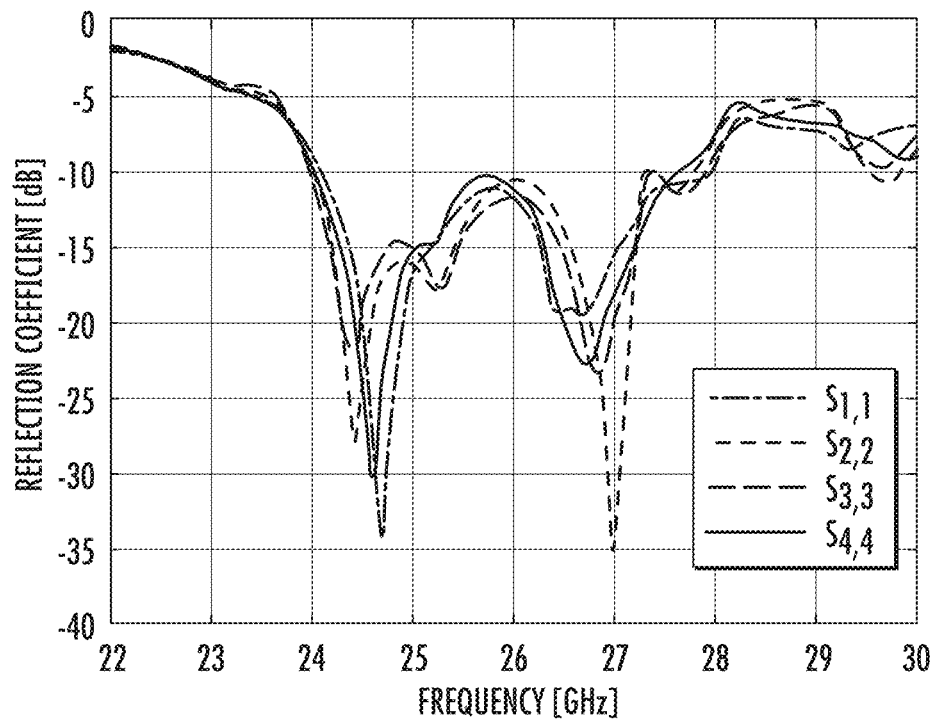
FIG. 12 is a graph of reflection coefficient across a range of frequencies of an antenna according to an embodiment of the presently disclosed subject matter.

In this way, for example, the present systems, devices, and methods can cover the frequency band n258 (24.25-27.5 GHz) as represented in FIG. 12, which is a promising band for the early 5G deployments. Of course, those having ordinary skill in the art will appreciate that the one or more antenna element 102 can be implemented using any of a variety of other high-gain, broadband antenna elements instead of Vivaldi antennas. In some embodiments, desirable performance can be achieved using antenna elements having a gain greater than 6 dBi and having an impedance bandwidth of more than 1 GHz at mm-wave frequencies.

Figure 2:
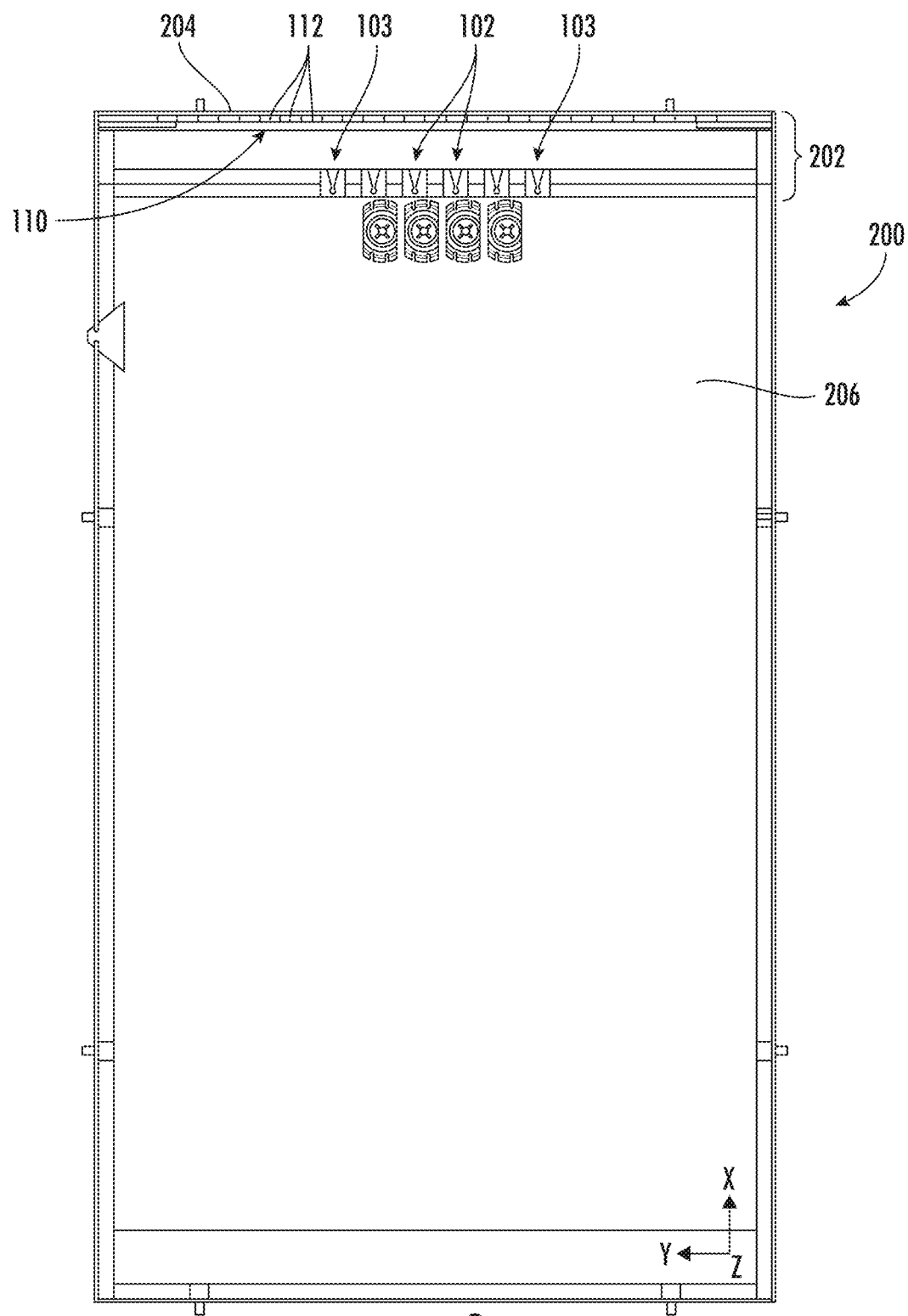
FIG. 2 is a plan view of a configuration of a high-frequency antenna of a mobile device according to an embodiment of the presently disclosed subject matter.
Figure 13A:
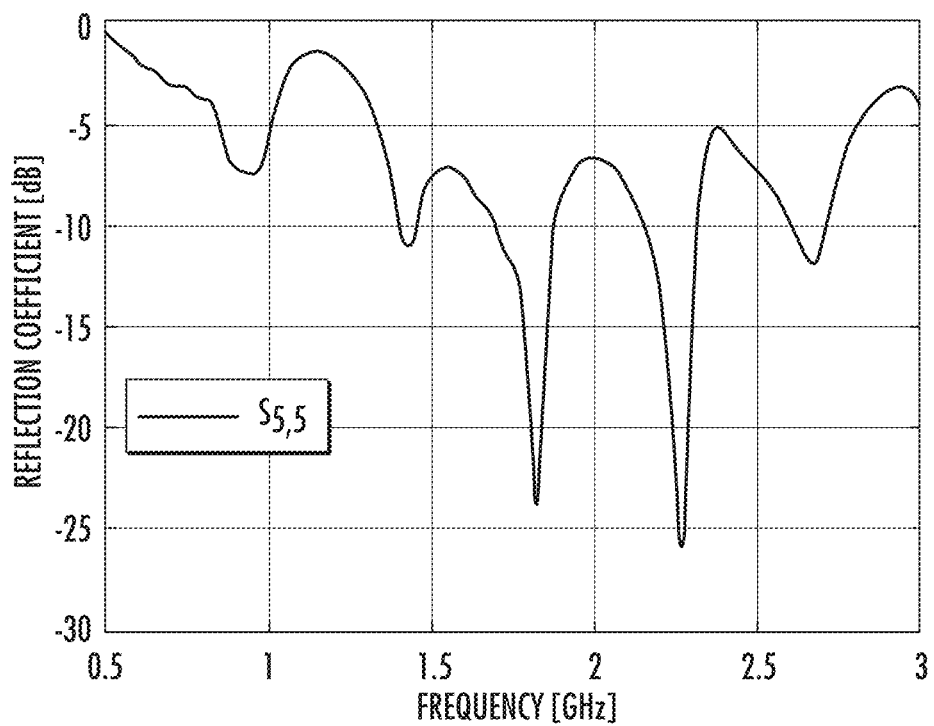
FIG. 13A is a graph of reflection coefficient over a range of frequencies of a low-frequency radiating component of an antenna system according to an embodiment of the presently disclosed subject matter.
Figure 13B:
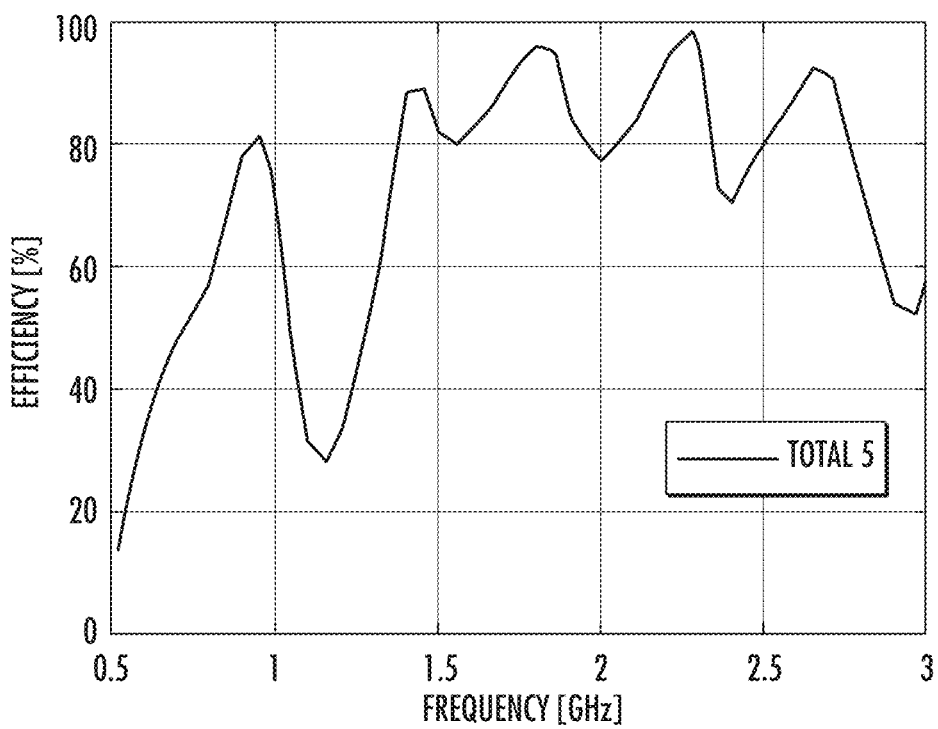
FIG. 13B is a graph of total efficiency over a range of frequencies of a low-frequency radiating component of an antenna system according to an embodiment of the presently disclosed subject matter.
Figure 14A:
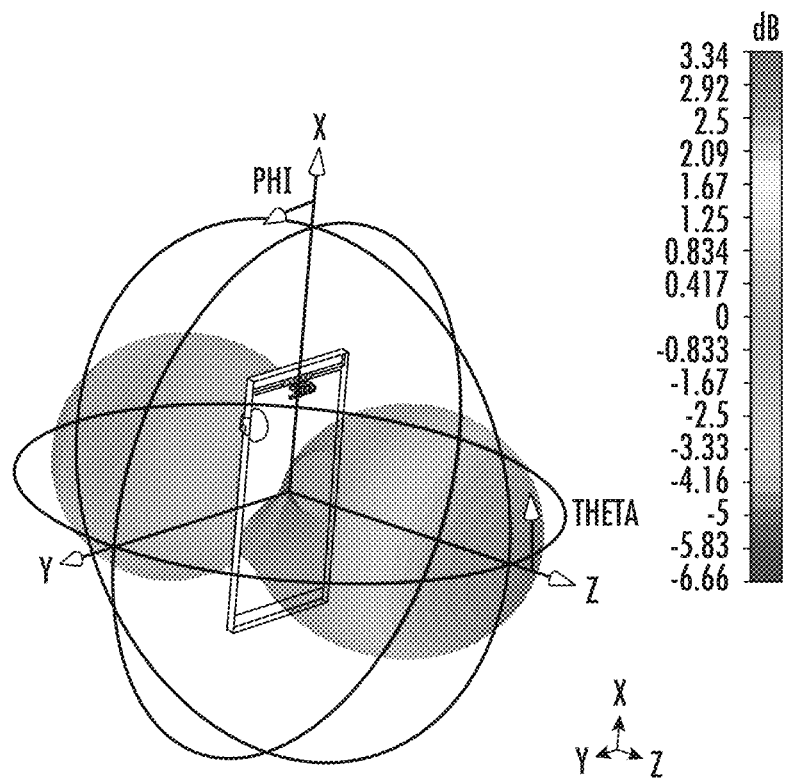
FIGS. 14A through 14D are graphs illustrating radiation patterns of a low-frequency radiating component of an antenna system at different operating frequencies according to an embodiment of the presently disclosed subject matter.
Figure 14B:
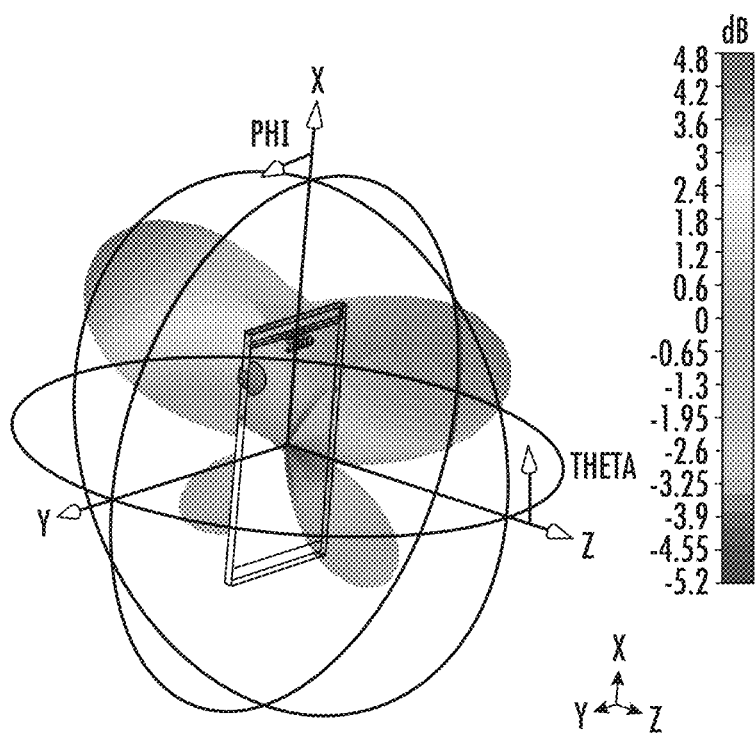
Figure 14C:
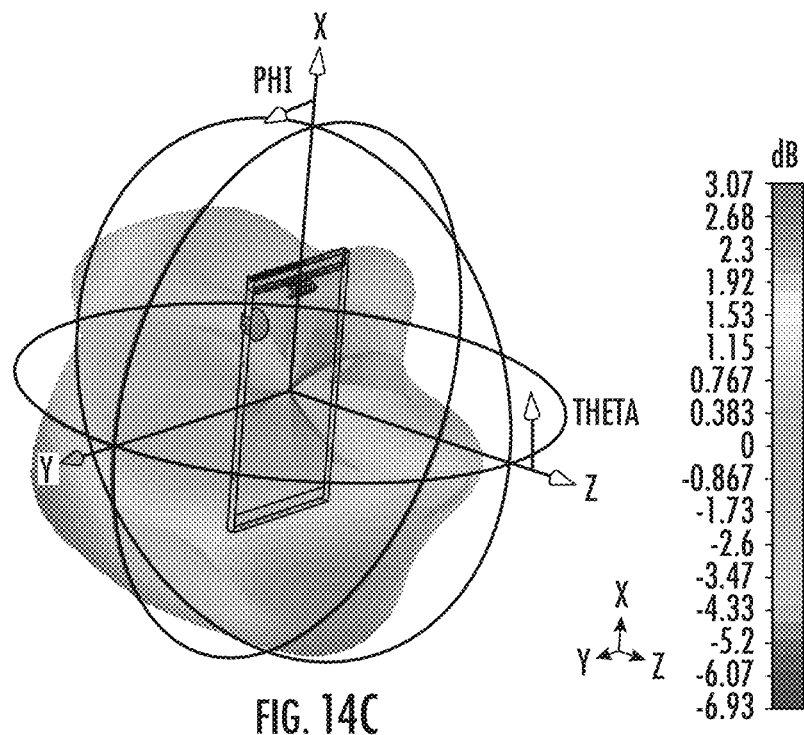
Figure 14D:
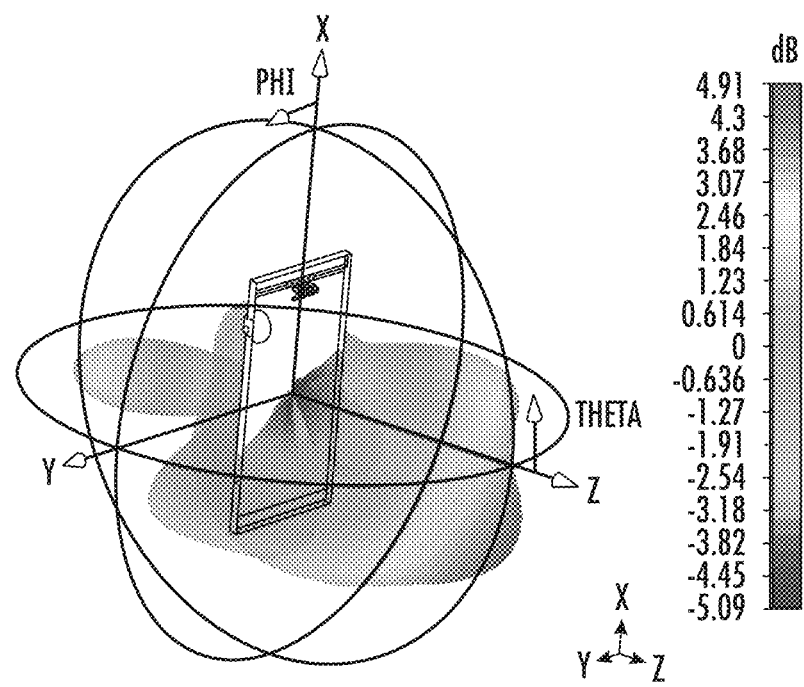

Regarding exemplary configurations for blocking structure 204, in the embodiments illustrated in FIGS. 1-3, for example, blocking structure 204 includes a metal frame that covers the edges of mobile device 200 substantially perpendicular to a substrate 206 of mobile device 200. In some embodiments, substrate 206 is a printed circuit board. From this configuration, a dual-loop antenna system can be formed when this metal frame is connected with the ground plane of the device, such as a ground plane associated with substrate 206. In the embodiment illustrated, the height of the strip is 5 mm on the left, right, and bottom sides, and 3 mm on the top edge; the thickness of the strip is 0.3 mm; and the total dimensions of the mobile device are 155.7×88.6 mm$^2$. The reflection coefficient of such a dual-loop antenna system is shown in FIG. 13A. The criterion for impedance matching is more relaxed at low frequencies (i.e., S55<−6 dB). The first operating band covers from 865-990 MHz and the second band from 1358-2786 MHz. As represented in FIG. 13B, the radiation efficiency of the low-frequency antenna is above 80% for the two frequency bands. Plots of the radiation pattern of the dual-loop antenna system at f=0.9 GHz, f=1.4 GHz, f=1.8 GHz and f=2.5 GHz, respectively, are illustrated in FIGS. 14A-14D. Those having ordinary skill in the art will recognize, however, that this configuration is presented to describe representative features of one embodiment that can be implemented with the disclosed system, but the principles discussed with respect to antenna array 100 are more widely applicable to any of a variety of other configurations.

Figure 15A:
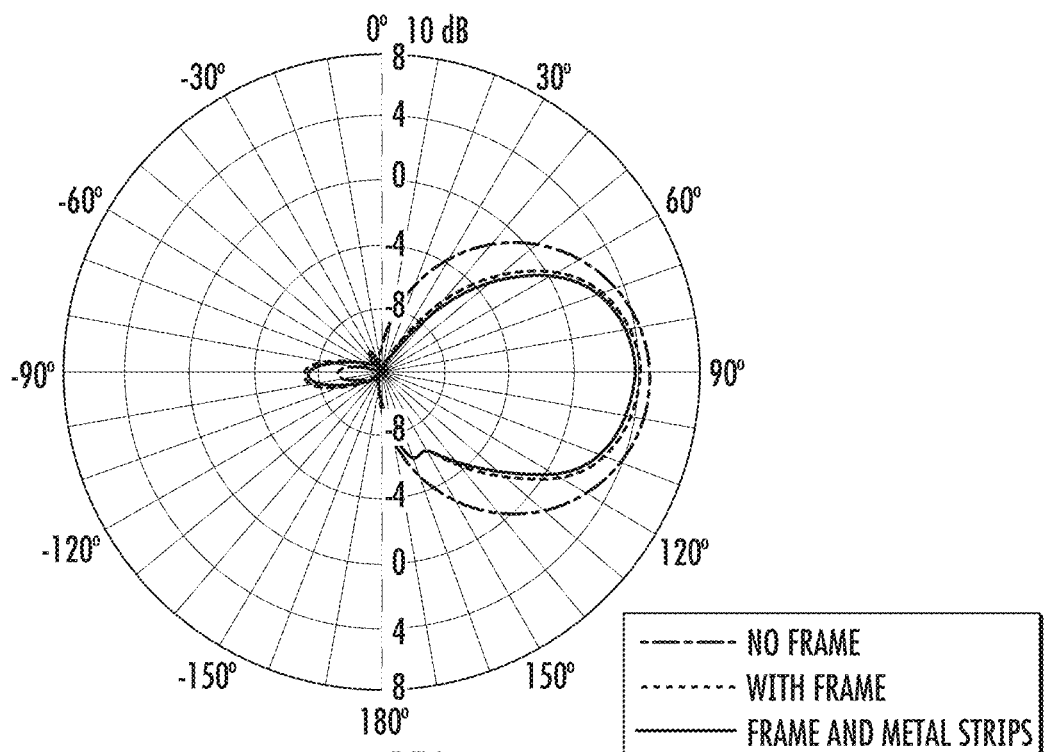
FIGS. 15A and 15B are graphs illustrating the effect of the parasitic metal strips in the radiation pattern for vertical polarization of an antenna element with a frame obstructing the view, according to an embodiment of the presently disclosed subject matter at 26 GHz.
Figure 15B:
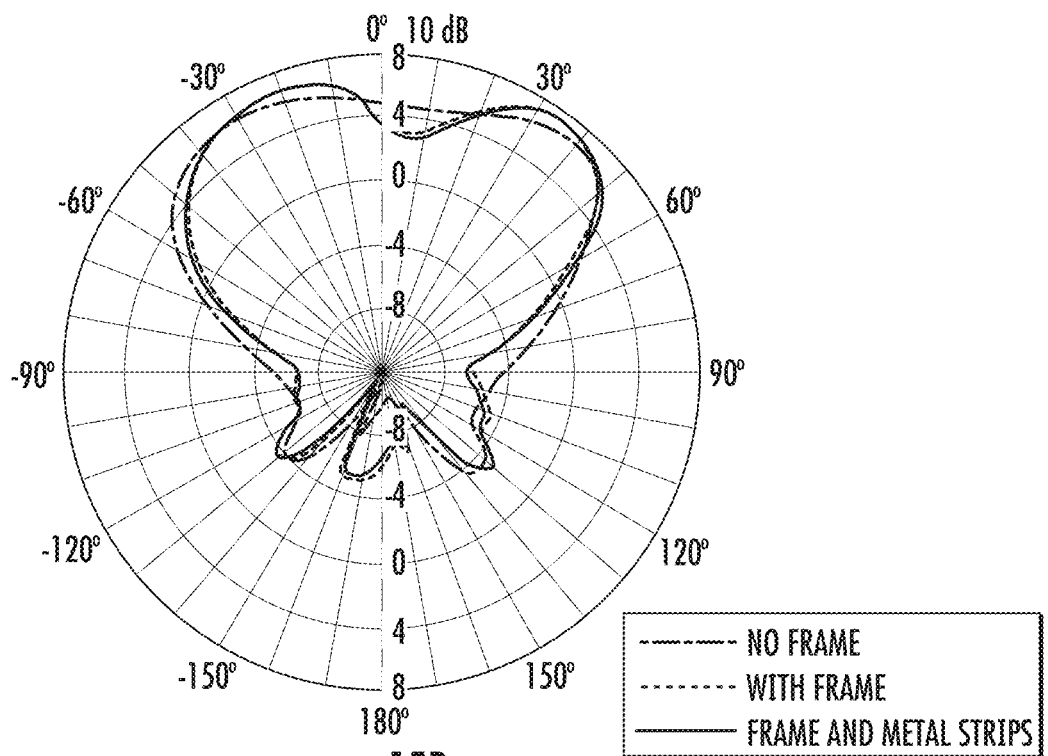
Figure 15C:
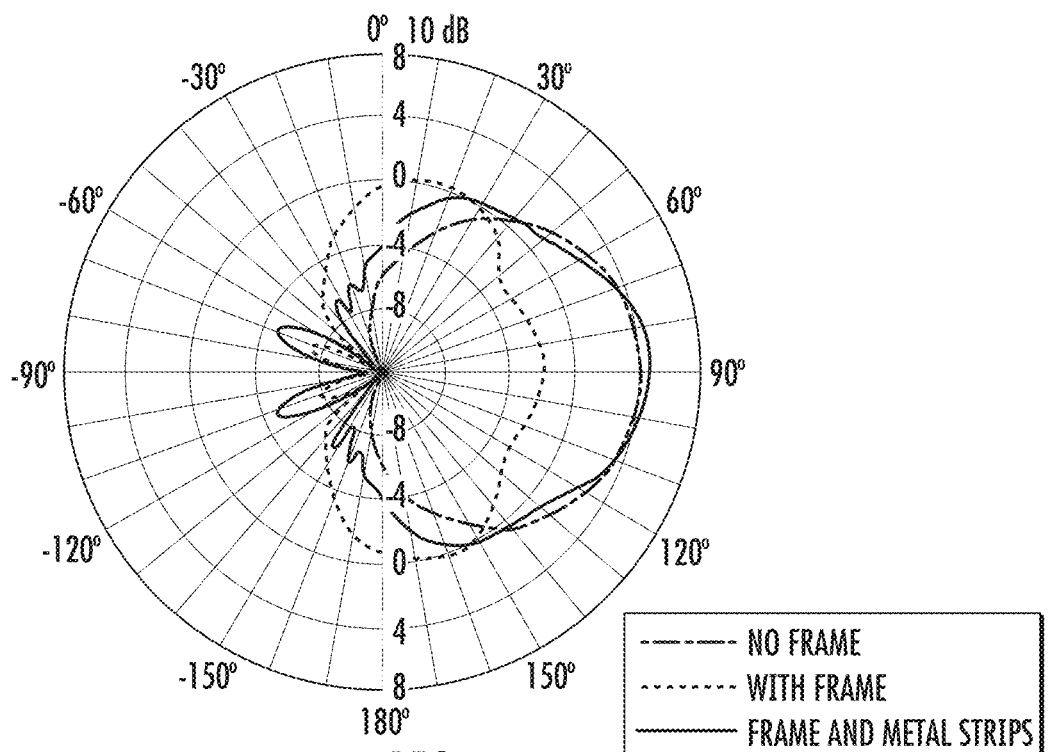
FIGS. 15C and 15D are graphs illustrating the effect of the parasitic metal strips in the radiation pattern for horizontal polarization of an antenna element with a frame obstructing the view, according to an embodiment of the presently disclosed subject matter at 26 GHz.
Figure 15D:
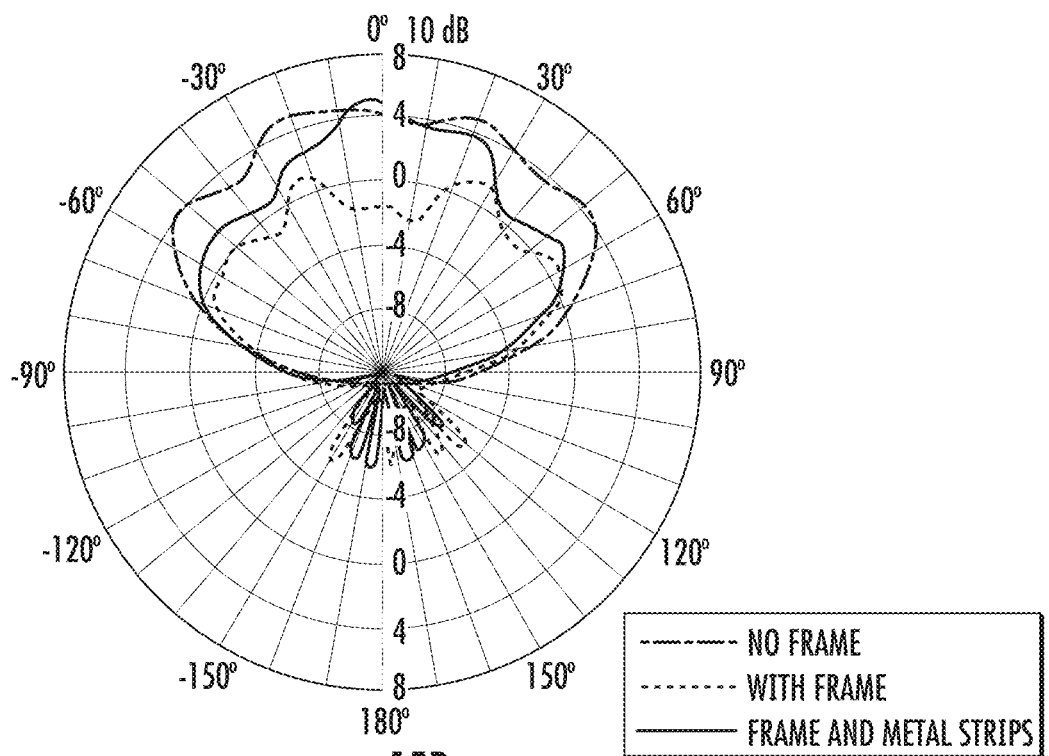

In any configuration, the design of antenna array 100 discussed above helps to overcome the blockage problem faced by end-fire radiation pattern-antennas when a metal or other signal-deflecting material is placed on top of the substrate obstructing the direction of the main beam. Alternatively or in addition, similar benefits can be achieved for systems that include antenna elements configured to radiate in directions other than a forward "end-fire" direction, such as antenna elements that are polarized in another direction that is blocked by a metal or other signal-deflecting material as discussed above. In some embodiments, the impact with antenna elements exhibiting vertical polarization (i.e., in a plane orthogonal to the substrate) can be lower or even barely noticeable compared with the impact with antenna elements exhibiting horizontal polarization (i.e., in a plane aligned with the substrate). In particular, FIGS. 15A and 15B are graphs illustrating the effect of the parasitic metal strips in the radiation pattern for vertical polarization of an antenna element with a frame obstructing the view, whereas FIGS. 15C and 15D are graphs illustrating the effect of the parasitic metal strips in the radiation pattern for horizontal polarization of an antenna element with a frame obstructing the view, each according to an embodiment of the presently disclosed subject matter operating at 26 GHz. In this way, in some embodiments, the passive elements improve the broadside lobe of the antenna elements that have been simulated.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. An antenna system comprising:
    at least one antenna element, wherein each of the at least one antenna element is configured to generate a directional radiation pattern including a main beam pointed in a first direction;
    a blocking structure at least partially obstructing a portion of the main beam in the first direction, wherein the blocking structure generates a reflected radiation pattern; and
    a parasitic radiator positioned in proximity to the blocking structure and configured to couple at least part of the reflected radiation pattern and radiate toward the first direction.

2. The antenna system of claim 1, wherein the at least one antenna element comprises an array of antenna elements; and
    wherein a phase of the directional radiation pattern generated by each element of the array of antenna elements is independently adjustable such that the first direction of the main beam is steerable.

3. The antenna system of claim 1, wherein the at least one antenna element comprises at least one Vivaldi antenna element.

4. The antenna system of claim 1, wherein the blocking structure forms a radiating structure at a frequency different than the at least one antenna element.

5. The antenna system of claim 4, wherein the at least one antenna element is mounted on a substrate; and
    wherein the blocking structure comprises a metallic frame that is coupled to a ground plane of the substrate.

6. The antenna system of claim 5, wherein the metallic frame and the ground plane are elements of a dual-loop antenna.

7. The antenna system of claim 5, wherein the at least one antenna element comprises at least one antenna element exhibiting polarization in a plane aligned with the substrate.

8. The antenna system of claim 1, wherein the parasitic radiator comprises one or a plurality of metal strips.

9. The antenna system of claim 8, wherein the metal strips are spaced apart from one another by a gap spacing.

10. The antenna system of claim 1, wherein the parasitic radiator is positioned proximal to one or both edges of the blocking structure.

11. The antenna system of claim 1, wherein the parasitic radiator positioned at a distance relative to the blocking structure that is smaller than one quarter of a wavelength of a signal produced by the at least one antenna element.

12. A method for operating an antenna array, the method comprising:
    generating a directional radiation pattern including a main beam pointed in a first direction from at least one antenna element;
    generating a reflected radiation pattern by at least partially obstructing a portion of the main beam in the first direction with a blocking structure; and
    coupling at least part of the reflected radiation pattern and radiating toward the first direction.

13. The method of claim 12, wherein the directional radiation pattern is generated by an array of antenna elements.

14. The method of claim 13, wherein generating the directional radiation pattern comprises steering the first direction of the main beam by independently adjusting a phase of the directional radiation pattern generated by each element of the array of antenna elements.

15. The method of claim 12, wherein the at least one antenna element is mounted on a substrate; and
    wherein the blocking structure comprises a metallic frame that is coupled to a ground plane of the substrate, wherein the metallic frame and the ground plane operate together as a dual-loop antenna.

16. The method of claim 12, wherein coupling at least part of the reflected radiation pattern comprises positioning a plurality of metal strips proximal to one or both edges of the blocking structure.

17. The method of claim 16, wherein positioning a plurality of metal strips proximal to one or both edges of the blocking structure comprises spacing the metal strips apart from one another by a gap spacing.

18. The method of claim 16, wherein the plurality of metal strips are positioned at a distance relative to the blocking structure that is smaller than one quarter of a wavelength of a signal produced by the at least one antenna element.

* * * * *